United States Patent [19]

Durdik

[11] Patent Number: 5,072,370
[45] Date of Patent: Dec. 10, 1991

[54] SYSTEM AND METHOD FOR MONITORING ELECTRONIC DATA PROCESSING EQUIPMENT

[75] Inventor: Paul A. Durdik, Binghamton, N.Y.

[73] Assignee: International Business Machines Corporation, Armonk, N.Y.

[21] Appl. No.: 520,578

[22] Filed: May 8, 1990

[51] Int. Cl.⁵ .................... H04M 11/04; G06F 3/00
[52] U.S. Cl. ................................. 395/575; 364/228;
364/229; 364/238; 364/238.5; 364/260.1;
364/264.1; 364/929; 364/940.1; 364/948.4;
364/DIG. 1; 364/DIG. 2
[58] Field of Search .................. 340/310 R; 264/200, 264/900

[56] References Cited

U.S. PATENT DOCUMENTS

| | | | |
|---|---|---|---|
| 4,218,738 | 8/1980 | Matyas | 364/200 |
| 4,357,605 | 11/1982 | Clements | 340/825.14 |
| 4,484,271 | 11/1984 | Miu et al. | 364/200 |
| 4,540,890 | 9/1985 | Gangemi | 307/40 |

OTHER PUBLICATIONS

McFadden & Hoffer, *Database Management*, 1985, pp. 3–4.

*Primary Examiner*—Michael R. Fleming
*Assistant Examiner*—Robert S. Hauser

*Attorney, Agent, or Firm*—Robert M. Carwell

[57] ABSTRACT

A plurality of electronic data processing machines comprised of remote personal computers, workstations, or the like, and a central monitoring host computer are interconnected to a conventional alternating current power bus. Each machine includes a power line modem for modulating and demodulating digitized data and control signals on to an off the power bus, respectively. The remote machines further include system software which digitizes a prompted-for user I.D. and respective unique machine I.D. code, stored in BIOS or other ROM, in the machine's operating system, or in DASDI in hidden files, and transmits, via modulation onto the power bus, these digitized codes to the host computer. The host computer includes software providing the functions of monitoring all power circuits for such encoded incoming machine and user I.D. information, for updating its database of machines with this incoming data, and further providing functions allowing the central monitoring computer operator to query the database and issue polling commands to selected remote equipment. Each remote machine's software further includes routines to monitor the power bus for such incoming polls from the host and transmitting the machine and user I.D.'s previously stored to the central monitor in response to such polling requests.

7 Claims, 4 Drawing Sheets

HARDWARE BLOCK DIAGRAM

SYSTEM AND METHOD FOR MONITORING ELECTRONIC DATA PROCESSING EQUIPMENT

DESCRIPTION

1. Technical Field

This invention relates to systems and methods for monitoring electronic data processing equipment and, more particularly, for identification and tracking of such equipment disposed at remote locations.

2. Background Art

The ever-increasing presence of electronic data processing or "EDP" equipment in the modern office building brings with it the need to track the whereabouts and, in certain instances, use of such equipment.

Current methods for accomplishing this objective typically are strictly and extremely manual labor intensive, requiring hours of inventory tracking personnel's time in tracking, record keeping serial number checking and the like. Moreover such current systems are not foolproof for numerous reasons. For example, a malevolent individual can easily move or remove EDP equipment without notifying the proper controlling authorities. This situation, symptomized by lost EDP assets and non-management approved use of such EDP assets, permeates industry today, and is even more severe in government and military installations, wherein simple unauthorized use of a machine may result in damage to national security beyond monetary measure.

Numerous systems have been known in the art for polling for various data, such as in the case of main frames interconnected to remote terminals and systems internal to a given personal computer which have been adapted to poll for presence of various adapter cards present on the bus. However, in the case of such main frame interconnections to remote terminals typically a session must be established between the main frame and the remote terminals. Although it is typical to provide for security features regarding the interconnection between such main frames and remote computers, such interconnections are typically established through local area networks with associated dedicated, specialized and often expensive cabling and the like, to establish the LAN.

Obviously, also in the case with the polling of adapter cards, power line modulation is not employed, but rather merely the conventional data address and command lines of conventional computer busses. Moreover, in the latter case, the basic function is simply to identify presence of certain adapter cards for configuration purposes, and, thus, these systems are inapposit to provision of machine security and related data collection and database functions which are not implemented in such polling systems.

Additionally, although the concept of modulation of data onto power busses has been known in the art, as, for example, in the case of various wireless home intercoms and control systems for controlling home appliances, and the like (as, for example, represented by the X-10 systems of the Tandy Corporation), such systems are typically employed to distribute data for control or communication purposes. They do not typically involve interactive polling and feedback procedures and, more particularly, are associated with the environment of an individual house and certainly not in the monitoring of a plurality of electronic data processing systems distributed at numerous sites.

Accordingly, for the foregoing reasons, it was highly desirable in the industry to provide for a system for monitoring location and usage of remotely disposed computer equipment, eliminating the labor-intensive aspects associated with conventional monitoring systems. It was further highly desirable to provide for such a system which did not entail the necessity of installing of expensive local area networks or other cabling. It was yet further desirable to devise such a system which could provide tamper protection intrinsic in the design, as is the case with the subject invention wherein any individual using a machine would be tied to the power line and, thus, readily detectable to the monitoring network.

It was yet further desirable to provide for such a system wherein, in order to monitor by a host processor, there was no necessity to establish a host-remote equipment session, so as to thereby avoid the hereinbefore noted requirement of conventional interconnection between a host and remote system by means of LAN or the like. In this manner, attempts to gain access to the central monitor would accordingly be thwarted in accordance with the teachings of the invention, inasmuch as the only interconnection between the host and remote equipment is via a power line. It was yet further highly desirable to provide a relatively simple, inexpensive and maintenance free monitoring system which could provide information as to which machines were present and in use in a given building, the identity of the individual using any specified machine, as well as the time periods of use, verification that uses were by authorized individuals, issuance of enabling commands to the remote units, determination of machines as presumed missing based upon monitored lack of use for an extended period or non-responsive answer back as a result of polling and the like.

These and other objects and benefits of the invention are provided herewith and may be understood more particularly with reference to the accompanying drawings.

SUMMARY OF THE INVENTION

A plurality of electronic data processing machines comprised of remote personal computers, workstations, or the like, and a central monitoring host computer are interconnected to a conventional alternating current power bus. Each machine includes a power line modem for modulating and demodulating digitized data and control signals on to and off the power bus, respectively. The remote machines further include system software which digitizes a prompted-for user I.D. and respective unique machine I.D. code, stored in BIOS or other ROM, in the machine's operating system, or in DASDI in hidden files, and transmits, via modulation onto the power bus, these digitized codes to the host computer. The host computer includes software providing the functions of monitoring all power circuits for such encoded incoming machine and user I.D. information, for updating its database of machines with this incoming data, and further providing functions allowing the central monitoring computer operator to query the database and issue polling commands to selected remote equipment. Each remote machine's software further includes routines to monitor the power bus for such incoming polls from the host and transmitting the machine and user I.D.'s previously stored to the central monitor in response to such polling requests.

BRIEF DESCRIPTION OF THE DRAWING

The novel features believed to be characteristic of the invention are set forth in the appended claims. The invention itself, however, as well as other features and advantages thereof, will be best understood by reference to the following description of the preferred embodiment, when read in conjunction with the accompanying, figures, wherein:

BEST MODE FOR CARRYING OUT THE INVENTION

Figure 1:
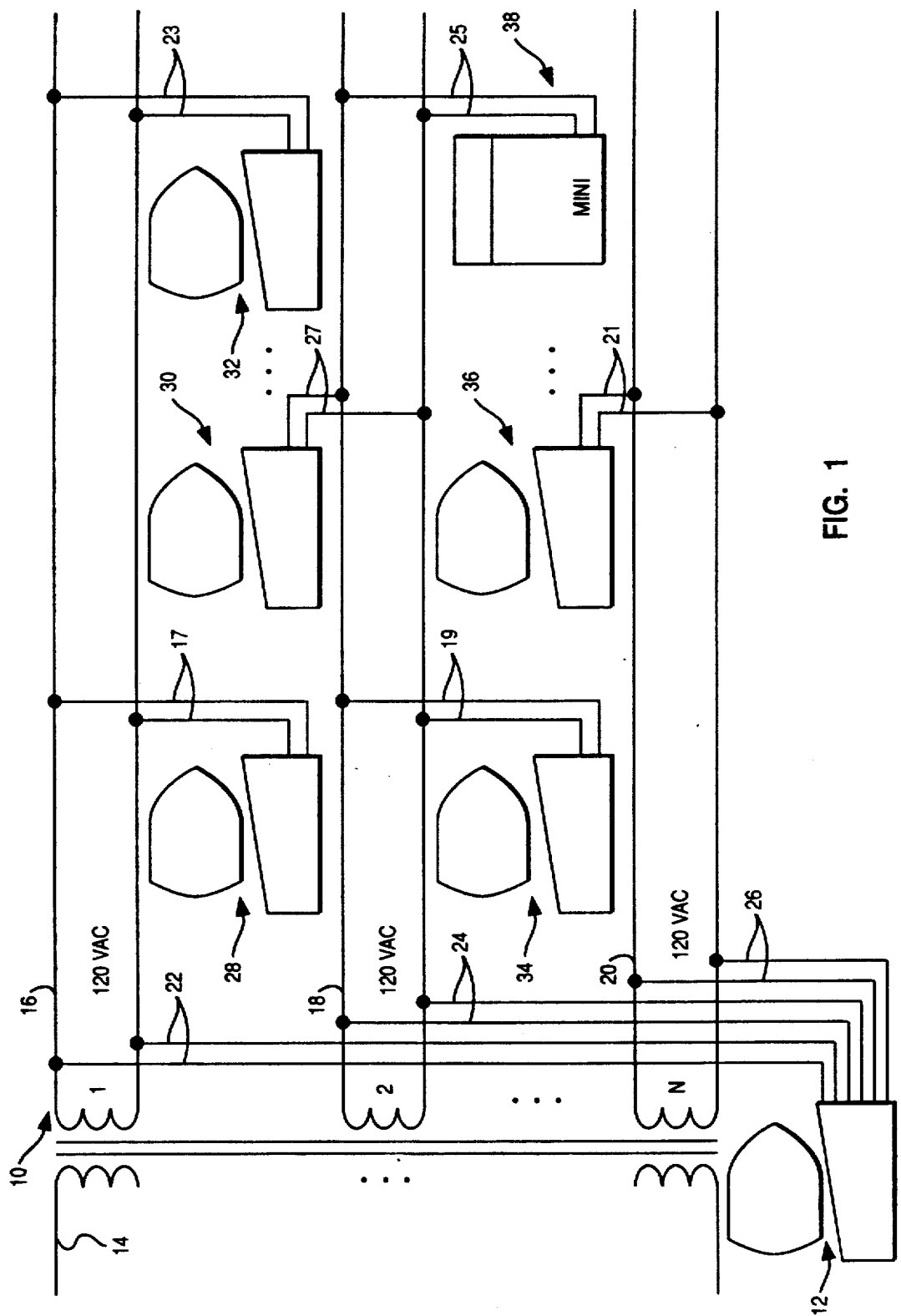
FIG. 1 is a schematic illustration of the system for monitoring presence and use of EDP equipment, depicting a host system and plurality of remote machines with a power bus communication link.

Described herein is a system for monitoring presence and use of electronic data processing equipment disposed at locations remotely of a host monitoring system. With reference to FIG. 1, the system 10, as broadly depicted therein, is comprised of a central monitoring computer 12 and one or more representative remote electronic data processing machines 28, 30, 32, 34, 36 and 38. The invention is not intended to be limited to any particular type of host or remote computer, and, thus, admits to the application with personal computers, workstations and even mini computers or the like, such as that depicted at reference numeral 38. The central monitoring computer 12 generally serves the purpose of maintaining control and a database of information on all the other machines in the system 10, as will hereinafter be described in greater detail, including which computers are deployed in various uses throughout a given building, for example.

Still referring to FIG. 1, it will noted that the remote systems 28, 30, 32, 34, 36 and 38 receive power, as does the host system 12, via a common conventional 110 volt AC power bus 14, as represented by connections 17, 19, 21, 23, 25 and 27 to the remote systems and interconnections 18, 20, 22, 24 and 26 to the host system 12, such power conventionally being delivered through appropriate power transformers well known in the art.

In addition to power to the various host and remote systems being delivered on the power bus, as just described, it is an important feature of the invention that communication is also provided through these power line connections via power line modems, which are deployed in a manner to be hereinafter described to ensure that a remote system in use remains. As previously described, by employing the power bus, the system of the present invention alleviates the cost associated with cabling a network with specialized dedicated cabling using traditional LAN cabling or the like.

Figure 2:
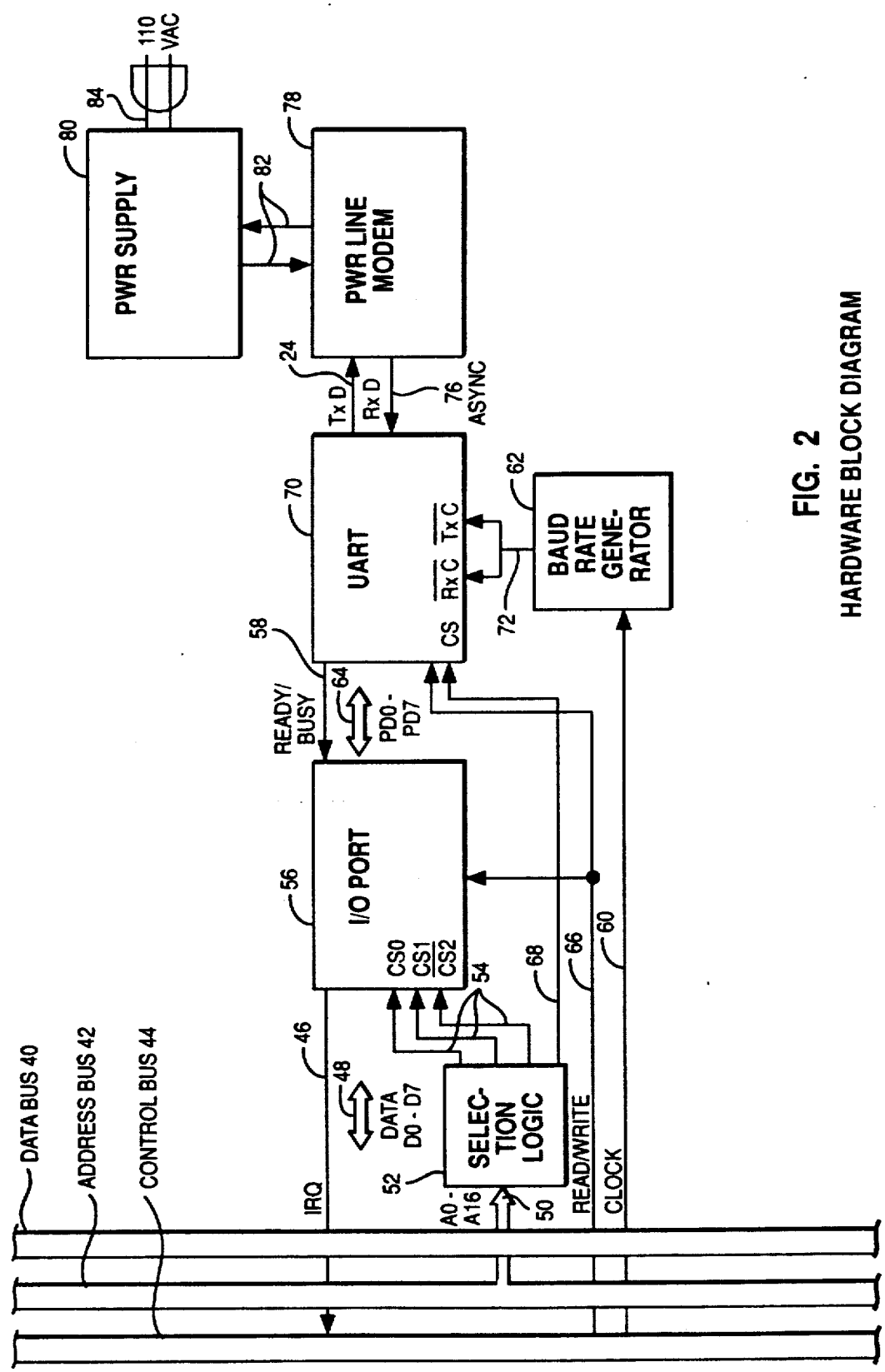
FIG. 2 is a functional block diagram of the hardware associated with each of the host and remote computer systems of FIG. 1 for effecting the system intercommunication of the invention.

Referring now to FIG. 2, depicted therein is the hardware provided with each remote and host system in order to implement the aforementioned power line communication. The device depicted in FIG. 2 with respect to a given remote or host computer of FIG. 1 is attached to the particular computer bus (which conventionally includes a data, address and control bus lines 40, 42 and 44, respectively) via an I/O port 56. In one implementation, this I/O port may be implemented by a digital integrated circuit, such as a Motorola 6820 chip or the equivalent. This port 56 allows data, represented by arrow 48 and 64, to be transferred to and from the port 56 by using typical INP (ADDR) and OUT (ADDR) commands or equivalents well known in the art. Alternatively, the hardware device depicted in FIG. 2 could also be mapped to unused memory of its respective computer system and accessed using commands such as STORE (ADDR) and LOAD (ADDR) commands also well known in the art. The hardware communication device of FIG. 2 may be configured to interrupt the microprocessor of the given remote computer in the event of an incoming message, or, in the alternative, a simple polling scheme may be substituted. Selection logic 52, in response to address commands 50 from the particular computer, will generate chip select signals 54 and 68 for controlling the functions of the hardware system of FIG. 2 in a conventional manner.

Still referring to FIG. 2, buffered bidirectional data flows in and out of the I/O port 56 to a uniform asynchronous receiver-transmitter or UART 70 such as an integrated circuit INTEL 8251 manufactured by the INTEL Corporation, or, in the alternative, some other serial/parallel conversion device as desired. Again, as is conventional, the microprocessor associated with the computer containing the FIG. 2 hardware will generate on the control bus 44 from time-to-time read-write signals 66 and clock signals 64 generating conventional read or write commands as required and for controlling the transmission and receiving rate of the system. With respect to the latter, a BAUD rate generator 62 receives this computer clock signal 60 and generates receive and transmit signals 72 delivered to the UART 70 for controlling the rate at which the digitized signals imposed on the power line 84 are transmitted or received. Outgoing serial messages generated by the computer are delivered on the transmission line 74 to a power line modem 78 which modulates them as shown by line 82 onto the power supply 80 of the particular computer and, thence, onto the power line 84 to which the computer is plugged in. Similarly, incoming data on the power line 84 is routed to the power supply 80 and delivered on line 82 to the power line modem 78 wherein these signals are decoded, and delivered on the asynchronous receive line 76 to the UART 70. In a conventional manner, this received data will thence be interpreted by the microprocessor system of the particular computer for use with the software program executing on the computer, in a manner to be hereinafter described. In a preferred embodiment, the power line modem may take the form of a NE5050 integrated circuit power line modem manufactured by the Signetics corporation or equivalent.

The system provided herein is accordingly far superior to a system requiring establishment of a LAN and interconnection of each remote machine thereto. As noted, this approach is impractical due to prohibitive costs of cabling every machine in a building together. Furthermore, such an approach does not guarantee that an unconnected machine is not being used somewhere in the building. Moreover, yet another problem with this approach arises when a machine configured as a public resource on the LAN becomes prey to anyone attempting to breach security.

Figure 3:
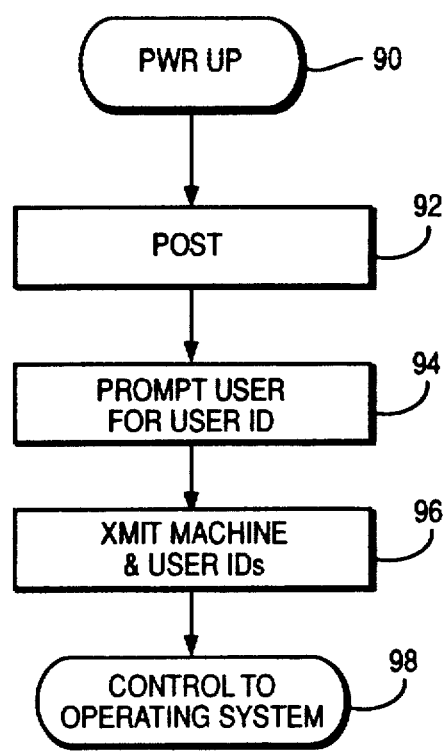
FIG. 3 is a functional block diagram of a computer program executed by a remote system of FIG. 1 on power-up.
Figure 4:
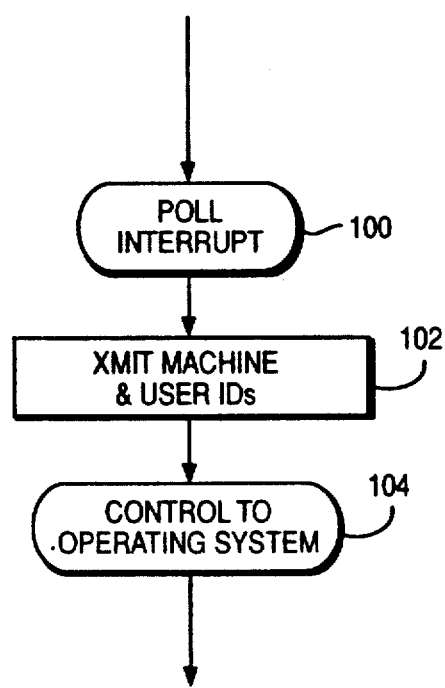
FIG. 4 is a functional block diagram of a next computer program executed by a remote system of FIG. 1 in response to an incoming interrogative message from the host computer.

Referring now to the computer programs necessary to be executed on the various computer systems of FIG. 1 to implement the present invention, referring more particularly to FIGS. 3 and 4, it will be noted that software in a representative remote computer will consist of essentially two routines. The first, as shown in FIG. 3, is preferably entered and executed immediately after the computer is powered up and has executed a power on self-test routine or "POST". This is shown in FIG. 3 by blocks 90 and 92, wherein after computer system power up, the POST routine is executed at block 92. After execution of the POST, the preferred routine executed by the remote computers will preferably include a routine prompting the user for a unique user I.D. as shown at block 94. The remote computer program will then preferably execute a sub-routine transmitting the thus prompted-for user I.D. and a unique machine identification code to the central monitoring computer 12 via the power line modem of FIG. 2 in the manner previously described. This step of machine and user I.D. transmission is shown in FIG. 3 at block 96. It will be noted at this point that each remote computer may preferably have stored therein in BIOS, other ROM, in DASDI or the like, a unique identifying number associated with that particular remote computer. Thus, at an appropriate time, either prompted by an interrupt from the host computer 12 or in response to a polling procedure, the particular remote computer, through execution of conventional software employing the data, address and control busses 40-44, may fetch from the known stored location this unique machine I.D. for modulation onto the power line. Finally, with respect to FIG. 3, upon such transmission of the machine and user I.D.'s by the remote system to the host system 12, upon completion of this task, the routine executed on the remote computers will preferably pass control back to the operating system allowing normal use of the remote computer, as shown at block 98.

The aforementioned second routine desirably executed by each remote control system is entered into in response to an incoming poll or interrupt from the central monitoring computer 12 via the power line. This incoming poll or interrupt interrogative from the host is schematically depicted in FIG. 4 at block 100. Upon decoding of this command off of the power line by the hardware of FIG. 2, the correlative remote computer in response thereto, will derive and modulate onto the power line its respective machine and user I.D.'s which were stored previously, for subsequent transmission to the central monitor 12. This program execution step is shown at block 102 of FIG. 4 whereupon control returns to the operating software, 104. As hereinbefore noted, these routines, as well as the machine I.D., may be burned into ROM of the representative remote computer or, in the alternative, embedded in the operating system or stored on DASDI as hidden files. As aforementioned, conventionally, it would be expected, however, with respect to the user I.D. that this would be entered by the particular user in response to a prompt. Once the aforementioned steps have been executed by the remote computer, it will resume with normal operation as indicated at block 104.

Figure 5:
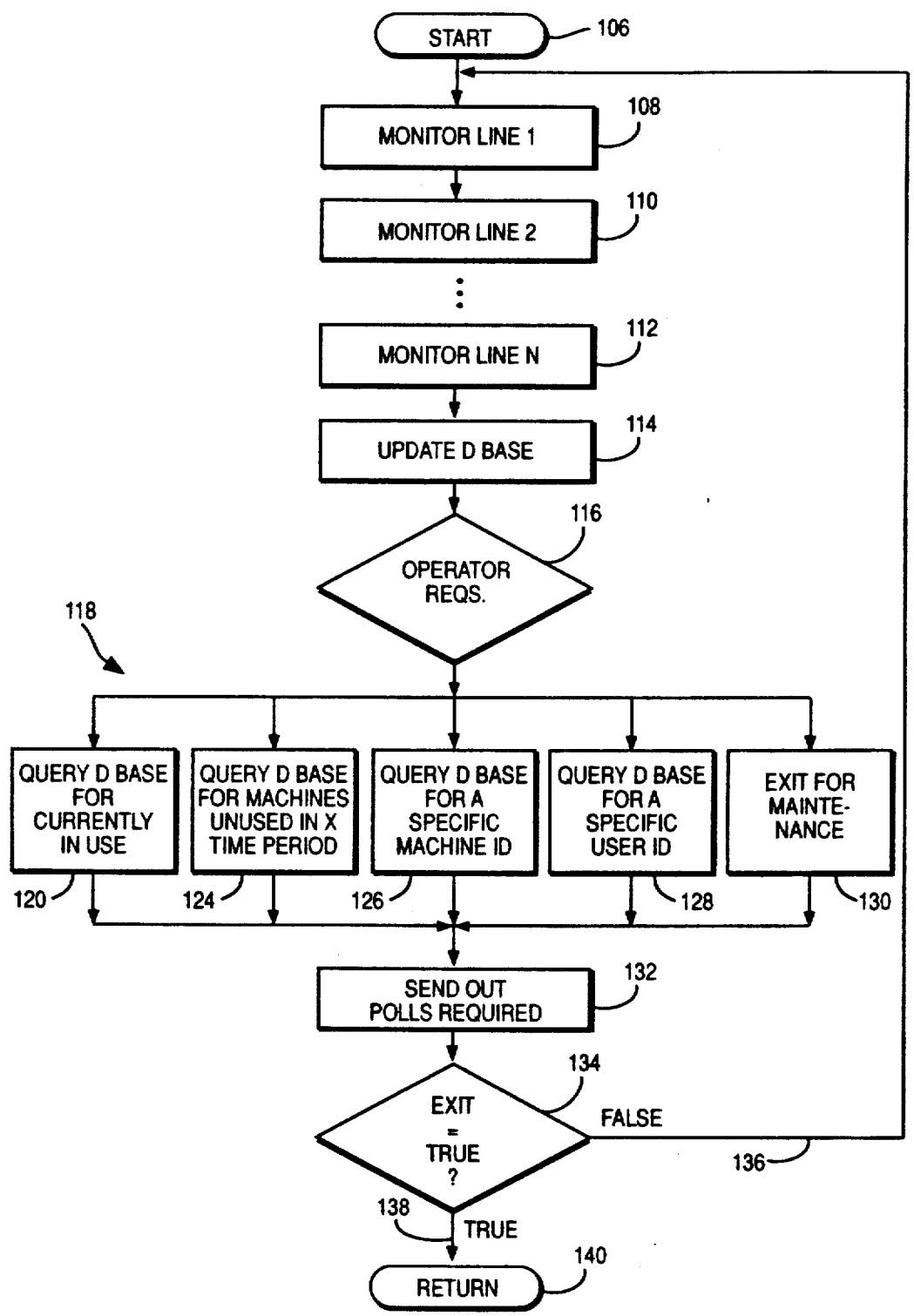
FIG. 5 is a functional block diagram of a computerized control program executed by the host system of FIG. 1.

Referring now to FIG. 5, depicted therein is a schematic functional block diagram of a computer program executed by the host system 12 for effecting the objects of the present invention. It will be recalled that the central monitoring computer 12 in response to software control implementing the functional steps of FIG. 5, will monitor all power circuits to which remote computers, which are to be monitored, are connected for incoming messages from these computers. Broadly, also in response to execution of the appropriate program represented by FIG. 5, the host monitor 12 will also perform numerous additional functions to be hereinafter described, including the updating of its database or remote machines from the information contained in these incoming messages from the remote machine. Further, the host computer 12 in response to program control, will provide functions allowing the operator to query the database for various items as will be described with reference to FIG. 5.

Referring now in more detail to FIG. 5, the computer program executing on the host system 12 will commence as shown at block 106 whereupon the lines 18-26, FIG. 1, will be monitored by the host 12 for incoming signals as shown generally at blocks 108, 110 and 112. Upon receipt of incoming data from each respective remote computer regarding the machine and user I.D.'s, the host computer 12 will update an appropriate database 114 with this data. The host system operator may then interact with the host, as shown at block 116, to select any number of a plurality of functions to be performed by the remote system 12 in response to this user input which is generally shown at reference numeral 118.

These tasks performable by the host system relating to the management of remote EDP systems include the choices of querying the database for machines which are currently in use, 120, querying the database for machines which have not been used for a specified period of time, 124, querying the database for a specific machine I.D. to determine that machine's status, 126, querying the database for a specific user I.D., for example, to determine which machine a user is accessing, 128, and a choice to exit a routine for maintenance, 130. It should be readily apparent that once the data regarding machine and user I.D. has been received by the remote computer 12, these interactive usages of this data, as generally shown at 118 of FIG. 5, are not intended to be so limited to only those functions depicted with reference to reference numerals 120-130. In other words, the invention lends itself to any number of applications of this data, and, thus, is not intended to be limited to only those described herein.

With continued reference to FIG. 5, once these user initiated functions, 118, have been performed, any necessary polls in response thereto are generated by the host computer 12 and modulated onto the power line, as shown at block 132. It will be noted that these polls could, if desired, include not only commands to a particular remote computer to send back its machine and user I.D.'s, but could further be used for purposes of providing additional data or control to the selected remote computer. After the poll or interrupt at 132 has been delivered, the operating software of the host system 12 will query at 134 whether it is desirable to exit the auditing routine. If the answer is affirmative, as shown at path 138, control will be returned at 140 to the operating system for further normal usage of the host 12. Alternatively, once these polls have been transmitted as necessary to remote machines requiring status updates, if an indication is received at 134 that an exit is not desired, i.e. so long as the executing monitoring program is not taken off line for machine maintenance, the control routes through path 136 to continue the just-described cycle indefinitely, e.g. namely monitoring the various power lines and interacting with the data obtained therefrom.

I claim:

1. A system for monitoring data processing equipment, comprising at least one remote computer system having a unique encoded identification associated therewith; a monitoring computer system; a power line interconnected to said at least one remote computer system and said monitoring computer system providing power to said systems;

wherein said at least one remote computer system and said monitoring computer system each include transmitting means interconnected to said power line for modulating encoded signals onto to said power line;

wherein said at least one remote computer system and said monitoring computer system each further include uniform asynchronous receiver-transmitter receiving means interconnected to said power line for demodulating said encoded signals off of said power line;

wherein said at least one remote computer system comprises a plurality of remote computer systems each with a respective different one of said encoded signals associated therewith;

wherein said transmitting means of said monitoring computer system includes means for generating and modulating onto said power line interrogative polling command requests received by said plurality of remote computer systems to cause at least one of said plurality of remote computer systems to modulate its said respective different one of said encoded signals onto said power line;

wherein said receiving means of said plurality of remote computer systems each include means for demodulating said polling command requests thereby generating demodulated polling command requests;

wherein said receiving means of said plurality of remote computer systems each further include means for causing said transmitting means of each said plurality of remote computer systems to transmit its said respective different one of said encoded signals in response to said demodulated polling command requests;

wherein said monitoring computer system further including database means interconnected to and executing on said monitoring computer system for storing each said different one of said encoded signals from said plurality of remote computer systems;

wherein each said different one of said encoded signals further comprises a unique user identification associated with a user interacting with a respective one of said plurality of remote computer systems;

wherein said database means further includes retrieval means responsive to input from a monitoring user for retrieval of a selected said user identification or said respective different one of said encoded signals; and user interface means interconnected to said transmitting means of said monitoring computer system for activating said transmitting means of said monitoring computer system for said modulating of said encoded signals in response to said retrieval; and further including means interconnected to said plurality of remote computer systems for disconnecting said plurality of remote computer systems from said power line in response to said interrogative polling command requests and; and wherein said system for monitoring data processing equipment further comprises means interconnected to said power line for determining duration of time a respective one of said plurality of remote computer systems is in operation as a function of a respective said different one of said encoded signals.

2. A system for monitoring data processing equipment, comprising at least one remote computer system having a unique encoded identification associated therewith; a monitoring computer system; a power line interconnected to said at least one remote computer system and said monitoring computer system providing power to said systems;

wherein said at least one remote computer system and said monitoring computer system each include transmitting means interconnected to said power line for modulating encoded signals onto to said power line;

wherein said at least one remote computer system and said monitoring computer system each further include uniform asynchronous receiver-transmitter receiving means interconnected to said power line for demodulating said encoded signals off of said power line;

wherein said at least one remote computer system comprises a plurality of remote computer systems each with a respective different one of said encoded signals associated therewith;

wherein said transmitting means of said monitoring computer system includes means for generating and modulating onto said power line interrogative polling command requests received by said plurality of remote computer systems to cause at least one of said plurality of remote computer systems to modulate its said respective different one of said encoded signals onto said power line;

wherein said receiving means of said plurality of remote computer systems each include means for demodulating said polling command requests thereby generating demodulated polling command requests;

wherein said receiving means of said plurality of remote computer systems each further include means for causing said transmitting means of each said plurality of remote computer systems to transmit its said respective different one of said encoded signals in response to said demodulated polling command requests;

wherein said monitoring computer system further including database means interconnected to and executing on said monitoring computer system for storing each said different one of said encoded signals from said plurality of remote computer systems; and further including means interconnected to said monitoring computer system and said data base means for detecting inactivity of one of said plurality of remote computer systems for a pre-selected time interval as a function of said storing each said different one of said encoded signals.

3. A method for monitoring computer systems, comprising generating an encoded signal by at least one first computer system; modulating said encoded signal onto a power line by said at least one computer system; transmitting said modulated signal from said at least one first computer system to a second computer system over said power line; receiving said transmitted modulated signal by said second computer system off said power line; and decoding said encoded signal from said power line by said second computer system;

providing power to said at least one first computer system and said second computer system through an identical said power line;

wherein said encoded signal generated by each said at least one first computer system is a unique digitized code;

generating an interrogative polling request command with said second computer system; and modulating said interrogative polling request command onto said power line;

decoding with said at least one first computer system said interrogative polling request command; and wherein said step of generating an encoded signal is in response to said decoded command; and detecting with said second computer system in response to more than one said encoded signal the duration of time said power is provided to said at least one first computer system.

4. The method of claim 3 wherein said generating an encoded signal comprises generating for each said at least one first computer system a digitized code each uniquely associated with a different one of said at least one first computer systems, respectively.

5. The method of claim 4 wherein said generating an encoded signal further comprises generating a digital code uniquely associated with each user of one respective said at least one first computer system.

6. The method of claim 5 further including storing each said encoded signal at said second computer system thereby creating a plurality of stored encoded signals; and retrieving with said second computer system selected ones of said stored encoded signals as a function of user input to said second computer system.

7. The method of claim 6 further including retrieving said plurality of said stored encoded signals; and detecting inactivity of one of said at least one first computer systems in response to said retrieving of said plurality of stored encoded signals.

* * * * *